United States Patent
Gonzalez

(10) Patent No.: US 7,445,299 B2
(45) Date of Patent: Nov. 4, 2008

(54) MINE RESISTANT BAND TRACK

(75) Inventor: René G. Gonzalez, Southfield, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 104 days.

(21) Appl. No.: 11/482,304

(22) Filed: Jul. 6, 2006

(65) Prior Publication Data
US 2008/0007117 A1 Jan. 10, 2008

(51) Int. Cl.
B62D 55/24 (2006.01)
B62D 55/247 (2006.01)

(52) U.S. Cl. .......................... 305/158; 305/34; 305/165

(58) Field of Classification Search ................. 305/60, 305/157, 158, 165, 166, 185, 34; 180/6.7, 180/9, 9.1; 89/1.13
See application file for complete search history.

(56) References Cited

U.S. PATENT DOCUMENTS

| 2,055,932 | A |   | 9/1936  | Kitchen |
|-----------|---|---|---------|---------|
| 2,416,183 | A | * | 2/1947  | Kraft ...................... 244/100 C |
| 2,442,390 | A | * | 6/1948  | Williams .................... 89/1.13 |
| 3,170,533 | A | * | 2/1965  | Fewel et al. .................. 180/9.1 |
| 3,244,458 | A | * | 4/1966  | Frost ............................ 305/34 |
| 3,427,078 | A | * | 2/1969  | Parsons ....................... 305/117 |
| 3,544,174 | A | * | 12/1970 | Giacosa ........................ 305/34 |
| 4,386,809 | A |   | 6/1983  | Lapsys |
| 4,461,516 | A |   | 7/1984  | Lee |
| 4,565,412 | A |   | 1/1986  | Comminge et al. |
| 4,715,668 | A |   | 12/1987 | Burmeister |
| 4,762,377 | A | * | 8/1988  | Burmeister .................. 305/34 |
| 4,892,365 | A |   | 1/1990  | Szakacs |
| 4,953,921 | A | * | 9/1990  | Burns ......................... 305/165 |
| 5,083,596 | A | * | 1/1992  | Kato et al. ............... 152/154.1 |
| 5,154,490 | A | * | 10/1992 | Burns ........................ 301/44.3 |
| 5,678,903 | A |   | 10/1997 | Batelann |
| 5,685,616 | A | * | 11/1997 | Burns ........................ 301/44.2 |
| 6,394,562 | B1 |  | 5/2002  | Sjostrom |
| 6,952,990 | B1 | * | 10/2005 | Clodfelter ................... 89/1.13 |

* cited by examiner

Primary Examiner—Jason Bellinger
Assistant Examiner—Kip T Kotter
(74) Attorney, Agent, or Firm—David L. Kuhn; Luis Miguel Acosta; Thomas W. Saur

(57) ABSTRACT

A band track for a tracked vehicle having enhanced resistance to mines includes a plurality of track pad units disposed on the bearing surface of the track band. The track pad units have extended end walls of sufficient height to distance the vulnerable portion of the band track from the shearing force of an exploding mine. These end walls are sufficiently strong to support the vehicle as it traverses terrain, but are configured to collapse in controlled manner under the force of an exploding mine. Such explosion forces a specifically configured front end wall of a trailing track pad to engage the matingly configured end wall of the leading track pad. The resulting mating juxtaposition of the adjacent end walls forms a relatively continuous physical barrier protecting the vulnerable section of the band track from shrapnel and other entrained ejecta of the explosion.

20 Claims, 3 Drawing Sheets

MINE RESISTANT BAND TRACK

STATEMENT OF GOVERNMENT INTEREST

The invention described herein may be manufactured and used by or for the United States Government for governmental purposes without the payment of any royalties therefore or thereon. This patent is expected to be assigned to the United States Government.

BACKGROUND OF THE INVENTION

1. Field of the Invention

The instant invention relates to band tracks for tracked vehicles, and more particularly, the instant invention relates to a mine resistant band track for tracked military vehicles, such as tanks, armored personnel carriers and the like.

2. Technical Considerations and Prior Art

Historically, warfare scenarios and deployment techniques have limited the use of land mines to certain well defined situations to impede or channel opposing forces. Advance knowledge of mine field locations could permit effective countermeasures using mine-clearing equipment, such as mine-clearing rollers mounted on lead vehicles, projected explosive line charges or, depending on the tactical situation, sacrificing vehicles and uniformed personnel by simply charging over the mine field.

Introduction of mechanically emplaced and air-delivered mines on the modern battlefield has compounded the problem of maintaining the mobility of armored vehicles. Air and artillery delivery capabilities have introduced offensive mining techniques wherein mines are laid at random along approach routes.

Tracked vehicles, such as tanks, can be stopped with relatively small explosive charges which are easily delivered by airplanes and artillery. Charges of this type cause a mobility failure by breaking track sections and temporarily stalling armored vehicles, such as tanks, which can then be destroyed by artillery and anti-tank weapons generally placed to cover a mined area.

Blast mines generally have two damaging mechanisms operative when exploded. The first is the shearing forces associated with the rapid expansion of the blast envelope. As this blast envelope is spherical, the force at the blast envelope front generally diminishes at a cubic rate as distance from the point of explosion increases, in volumetric relationship to the spheroidal expansion. The second damage mechanism is the impact of entrained ejecta, whether from intentionally included shrapnel or from ground debris ejected upon explosion. The damage effect of the ejecta diminishes at a squared rate as the distance from the point of explosion increases, in relationship to the area of the spheroidal expansion surface.

Band type tracks employ flexible material and are generally more vulnerable to being rendered inoperable by mines than are conventional chain-like hinge pinned type tracks. In band tracks fitted with track pads, the band track typically fails along a transverse line at the front or rear of one or more of the track pads. For a given event, it is not clear whether the failure caused by a mine explosion is primarily attributable to the shearing forces generated by the movement of the band track when impacted by the spherical blast envelope of the explosion or the impact of blast entrained ejecta. In most cases, it is likely that the band track failure is caused by both damaging mechanisms.

In view of this evolution in expected battlefield conditions, there continues to be a need for new and improved mine resistant track configurations, including band tracks, for tracked vehicles. Further, it is desirable that such improved band track configurations resist both types of damaging mechanisms, the shearing forces and the blast entrained ejecta.

SUMMARY OF THE INVENTION

In view of the aforementioned considerations, it is a feature of the instant invention to provide a new and improved band track assembly able to withstand explosive charges which are sufficient to disable the tracks of current tracked vehicles.

In view of this feature, the instant invention contemplates a band track which includes a plurality of track pad units disposed on the outside or bearing surface of a traditional track band. The track pad units have extended end walls giving the track pad a certain height which distances the vulnerable portion of the track band from the shearing force of an exploding mine. The end walls of the track pad are configured with sufficient thickness, given the strength characteristics of the specific material selected for the pad, to support the vehicle as it traverses terrain characteristics, but are narrow or thin enough that the pad will collapse in a controlled manner under the greater force of an exploding mine. The end walls of the subject track pad are provided with curved sides that help deflect, rather than transmit, the very large compressional forces of the blast, thus tending to prevent development of the large shearing forces contributing to band track failure.

Moreover, the end walls are further configured such that they collapse in a relatively controlled manner, whereby the force of an exploding mine forces a curved front end wall of a trailing track pad to mate or engage with the matingly configured end wall of the leading track pad. The mating juxtaposition of the respective end walls of the adjacent pads forms a relatively continuous physical barrier protecting the vulnerable section of the band track from shrapnel and any other entrained ejecta of the explosion.

In addition, the instant invention contemplates a wheel and track assembly employing the afore-described track pad and track assembly in combination.

DESCRIPTION OF THE PREFERRED EMBODIMENT

Figure 1:
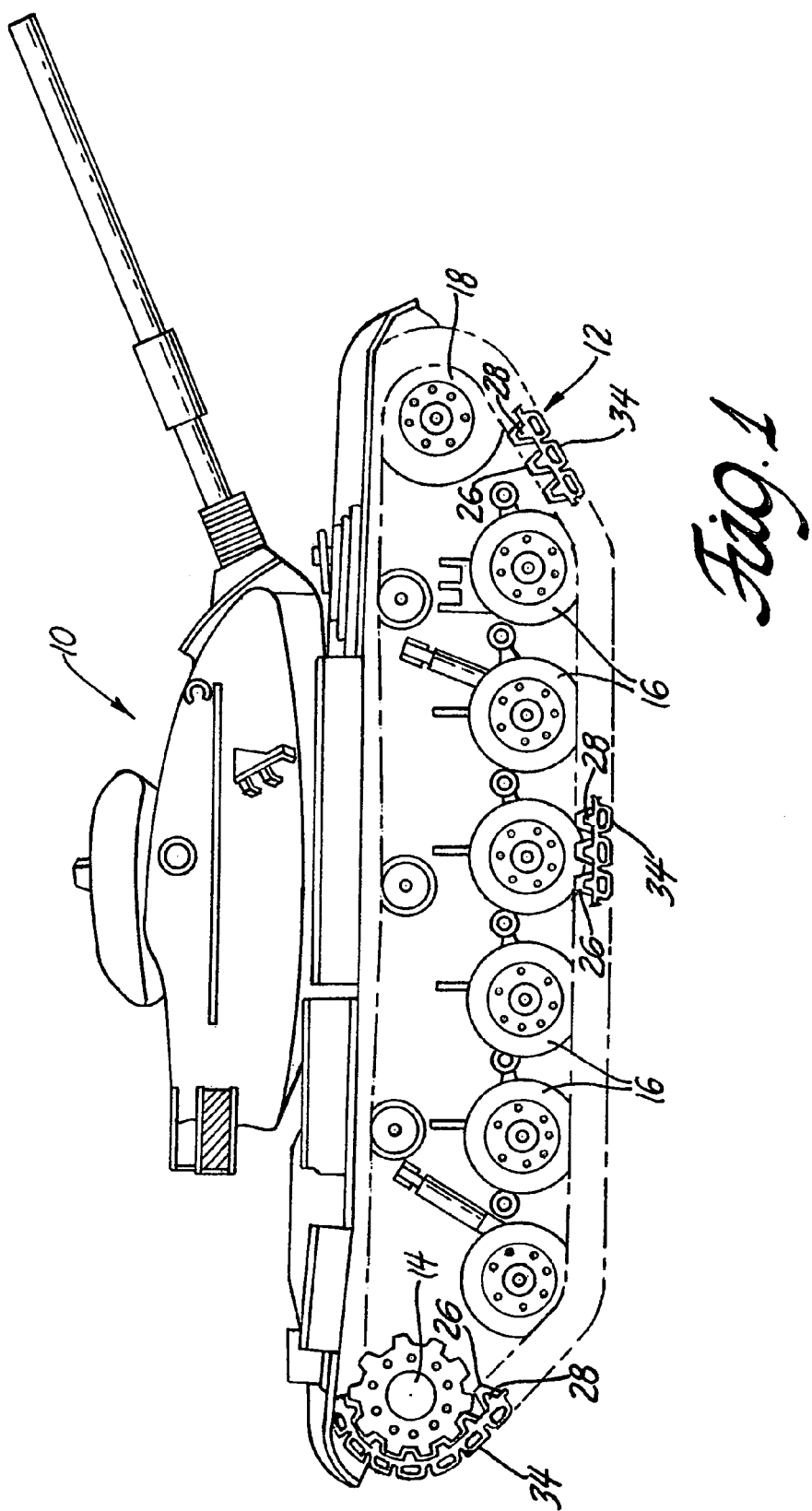
FIG. 1 is a side view of an armored vehicle, in this case a tank, employing the track pad and band track assembly in accordance with the features of the instant invention.

As seen in FIG. 1, a tracked vehicle 10 may be of the type that includes a band track 12 which is driven by a drive wheel 14. Band track 12 is further entrained about multiple road wheels 16 and typically about an idler wheel 18. In a preferred embodiment shown in FIG. 2 but seen better in the cross-sectional view of FIG. 3, the subject invention band track 12 comprises a band body 20 having an inner surface 22 and an outer surface 24. A center guide 26 is disposed on inner surface 22 and typically is medially placed thereon. Further, side guides 28 are located at at least one edge, and more typically at both edges, of the inner surface 22.

Those of ordinary skill in the art will appreciate that, as in conventional wheel and track assemblies for tracked vehicles, the powered motion of the drive wheel 14 in turn causes the orbital motion of the endless band track 12 around entrained road wheels 16 and idler wheel 18. It is also to be appreciated that the same wheel and track assembly and operation is provided on the other side of the vehicle 10. Also in conventional manner, the orbital motion of the band track 12 is driven and guided by the operation of center guide 26 and side guides 28 on the inner surface 22 of the band track 12, in coordination with appropriate guide receiving elements on each of wheels 14, 16 and 18.

A track pad 30, comprised of multiple track pad units 32, is disposed along the entire circumferential length of outer surface 24 of band body 20. Each track pad unit 32 has a bearing or road surface 34 which is in contact with the varying surfaces of the different terrain over which the vehicle 10 travels. Bearing or road surface 34 may be selectively textured or studded to increase traction of the road surface 34 over the prevalent terrain condition. Each track pad unit 32 also comprises a front end wall 36 and a back or rear end wall 38 respectively placed at each end of unit 32 and extending from outer surface 24 of band body 20 to road surface 34. The front end wall 36 extends contiguously from the outer surface 24 of band body 20 to a front edge of the bearing surface 34 and the rear end wall 38 similarly extends contiguously from the outer surface 24 of the band body 20 to a rear edge of the bearing surface 34. Thus, the outer surface 24 of band body 20, rear end wall 38, bearing surface 34 and front end wall 36 define a pad cavity 40.

Figure 2:
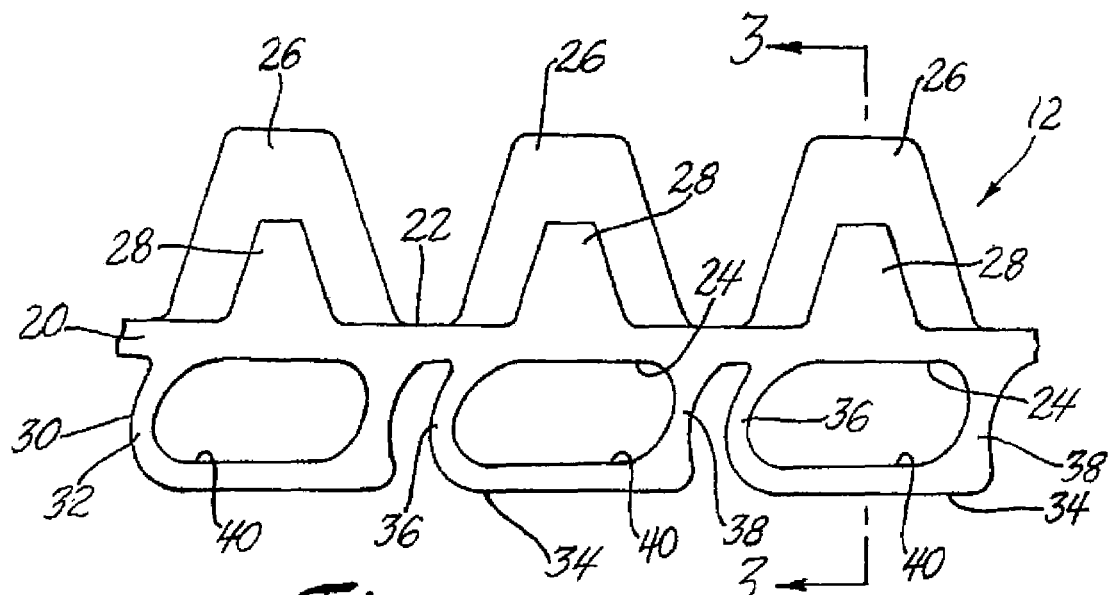
FIG. 2 is a side view of a portion of band track illustrating a number of the track pad units which form the track pad of the present invention.
Figure 3:
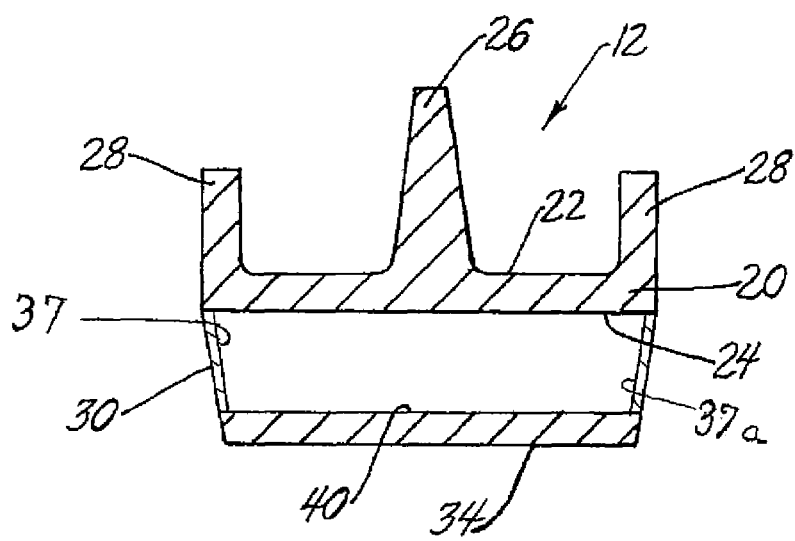
FIG. 3 is a cross-sectional view of a track pad unit of the present invention, taken along line A-A of FIG. 2.
Figure 4:
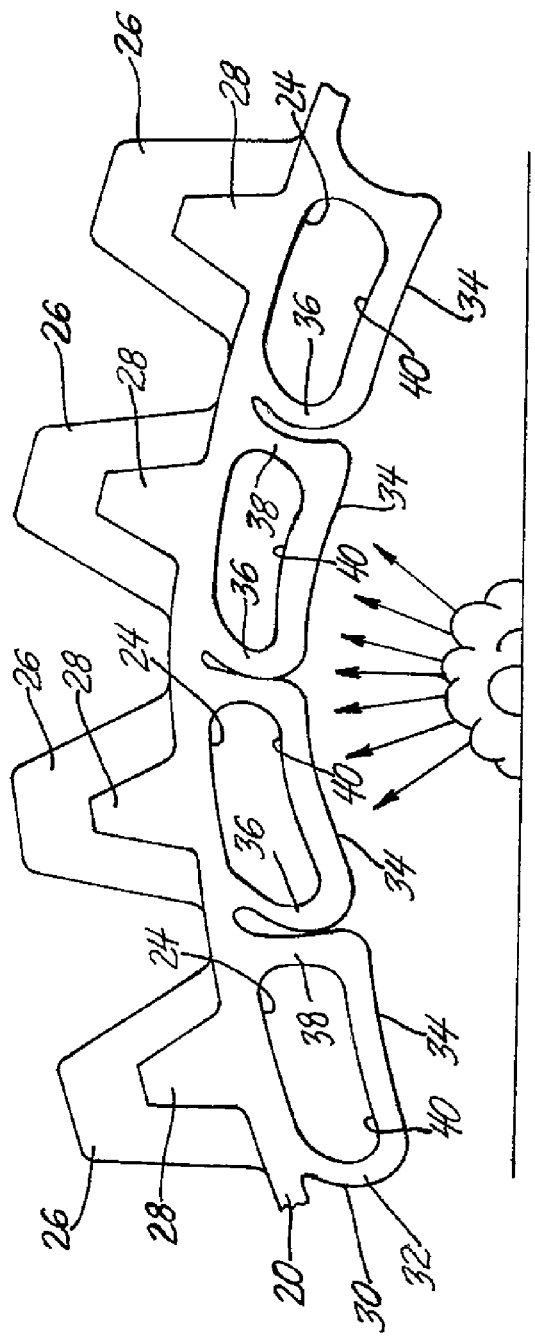
FIG. 4 is a side view of a portion of the band track demonstrating the operation of the track pad units of the subject invention under the compressional force of the explosion of a mine.

In the preferred embodiment shown in FIGS. 2 and 4, track pad units 30 are open sided, i.e., have no side walls such that pad cavity 40 presents openings in the direction transverse to the length of band track 12. One of skill in the art, however, will appreciate that the subject invention will also provide its intended benefits in another configuration where the track pad unit 32 is provided with side walls 37 such that pad cavity 40 is fully enclosed. Those skilled in the art will appreciate that the benefits of side walls, including the ability to avoid the extra weight of debris which might otherwise be picked up in the pad cavity 40, may be counterbalanced by the weight of the side walls themselves. Alternative embodiments of track pad unit 32 may further comprise sealed side walls 37a as shown in FIG. 3, which combine with a sealed interior face of band body 20, a sealed interior face of bearing or road surface 34, and sealed front and rear walls 36 and 38, to form a track pad cavity 40 having an enclosed volume capable of being filled with a gas, such as air, which may further be pressurized, creating a pneumatic element. In yet another alternative embodiment, this enclosed volume of track pad cavity 40 could be filled with a fluid, pressurized or unpressurized, creating an hydraulic element.

The track pad units 32, and specifically the ends walls 36 and 38, are to be configured of such a width and thickness, given the strength of its composition material, that they will support the weight of the tracked vehicle 10, with its supplies and occupants, as it travels over all types of terrain. Yet the width, thickness and strength of the front end wall 36 and the rear end wall 38 are selected such that these walls will collapse in a controlled manner under the force of a mine explosion. Moreover, the front wall 36 of each trailing track pad unit 32 is configured to matingly engage or matingly nest with the appropriately configured juxtaposed rear end wall 38 of the other, leading track pad unit 32 in such controlled collapse resulting from the compressional force of a mine explosion.

In the preferred embodiment depicted in FIGS. 2 and 4, the front wall 36 has a generally convex arcuate shape capable of matingly engaging or matingly nesting with the generally concave arcuate shape of the adjacent rear end wall 38 of neighboring track pad unit 32. It may be preferred, although it is not critical., that the curve of the front end wall 36 be oriented so that it is convex relative to the forward direction of movement of the track 12 and that the rear end wall 38 be oriented to matingly curve in an arc which is concave relative to the forward direction of movement of the track 12. Other embodiments in which the juxtaposed end walls have other mating configurations which can be conjoined upon controlled collapse are also within the scope of the present invention, so long as the shape and strength of the end walls 36 and 38 of track pad unit 32 can support the vehicle 10 as it travels across multiple types of terrain and yet will controlledly collapse or buckle under the force of a mine explosion.

Figure 5:
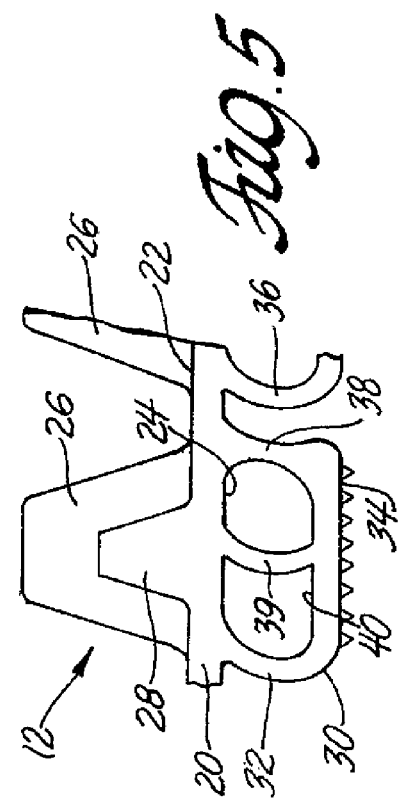
FIG. 5 is a side view of a portion of an alternative embodiment of the subject track pad further comprising a support wall or septum and a studded bearing or road surface.

In another embodiment shown in FIG. 5, the track pad unit 32 may further comprise one or more additional interior support walls or septa 39, located between front end wall 36 and rear end wall 38, and extending between an interior side of bearing surface 34 and an exterior side of band body 20. As explained above in connection with the configuration of end walls 36 and 38, interior support septum or septa 39 are configured of such width and thickness, given the strength of its compositional material, to assist in supporting the weight of the tracked vehicle 10 as it traverses different terrain conditions. It will be appreciated by those of skill in the art that as the number of supporting septa 39, which work in combination with end walls 36 and 38 to support the vehicle 10, is increased, each supporting wall 39, and also end walls 36 and 38 if desired, may be made thinner. Further, interior support septum or septa will be formed in a shape designed to further cooperate in the controlled collapse of the track pad unit in general, when the latter undergoes exposure to the explosive force of a mine. For example, the shape of the support septa 39 may be, but is not limited to, the arcuate shape analogous to the arcuate shape of front wall 36 and rear wall 38 illustrated in FIG. 5.

In all embodiments, under the compressional force of an exploding mine, the end walls 36 and 38 of multiple track pad units 32 will controllably buckle or collapse such that adjacent pairs of front end walls 36 and rear end walls 38 will be conjoined to provide an essentially continuous physical barrier to the entrained ejecta, minimizing the deleterious effect this ejecta will have on the band body 20. Maintaining the integrity of the band body 20 will allow the band track 12 to continue functioning, thus maintaining vehicle mobility even after being subjected to a mine explosion.

Another aspect of the subject invention's ability to resist mine explosion relates to the height of the end walls 36 and 38. Since the rapid expansion of the blast envelope of an exploding mine is essentially spherical, the associated shearing forces of the blast envelope will diminish in a cubic relationship as a function of distance from the point of explosion, just as the volume of a sphere increases as a cubic function of the sphere radius. Accordingly, the height of the end walls 36 and 38 will serve to distance the vulnerable band body 20 from the mine thus minimizing the effect of the shearing forces on the band body 20 upon explosion. The height of the end walls 36 and 38 must also be selected with consideration of additional factors such as overall vehicle height, track band weight and related fuel consumption, physical characteristics of the material from which the track band of the subject invention is formed, and the like. In a preferred embodiment, the height of the end walls 36 and 38 may range from about 25 mm. to about 150 mm.

In operation, a time delayed mine, or a mine supplied with an insensitive fuse, may explode at some time after initial passage of the leading track pad, when the band track 12 may be in a position such as that illustrated in FIG. 4. In such case, under the sudden pressure increase of the blast envelope of the exploding mine, a plurality of the track pads 30 will undergo collapse of their respective front end walls 36 and rear end walls 38, such that adjacent front and rear end walls on adjacent track pads 30 will be conjoined. Thus, the ejecta from the explosion confront an essentially continuous physical barrier formed by the conjoined end wall pairs and the intermediate track pad bearing surfaces 34. In this manner, the ejecta have reduced effect on the band body 20. Moreover, the effect upon the band body 20 of the shearing force of the blast envelope is diminished by the greater distance the blast envelope must travel, as a result of the height of the end walls 36 and 38 of each track pad unit 32. Therefore, the track body 20 has significantly greater chance of maintaining its continuous physical integrity, keeping the vehicle 10 mobile in its hostile environment. By this operation, the band track of the subject invention well satisfies its mine resistant function allowing the vehicle 10 and its occupants to maintain mobility.

Various alterations and modifications which do not depart from the scope and spirit of the invention will become apparent to those skilled in the art upon review of the foregoing specification and it is to be understood that the subject invention is to be limited only by the following claims.

What is claimed is:

1. In a band track for a tracked vehicle, the improvement comprising a track pad disposed on an outer surface of a band body of the band track, the track pad comprising: a plurality of track pad units, each unit having a bearing surface, a front end wall contiguous between the outer surface of the band track and a front edge of the bearing surface, and a rear end wall disposed opposite the front end wall contiguous between the outer surface of the track body and a back edge of the bearing surface, the front and rear end walls being of only such width sufficient to support the vehicle as it traverses terrain but sufficiently narrow to collapse under the force of an exploding mine, wherein the front end wall curves in an arc which is convex relative to the forward direction of movement of the track and the rear end wall curves in an arc which is concave relative to the forward direction of movement of the track, the arcs of the front and rear end walls configured to matingly nest with each other under the compressive force of the explosion of a mine.

2. The band track of claim 1 wherein the front and rear end walls are of height sufficient to minimize the explosive effect of a mine on the outer surface of the track band.

3. The band track of claim 1 wherein the front and rear end walls are arcuately curved as each extends from the bearing surface to the outer surface of the track band, whereby the shear force of the explosion of a mine is dispersed away from the outer surface.

4. The band track of claim 1 wherein the track pad further comprises sealed side walls which, in combination with a sealed interior face of the bearing surface, and a sealed interior face of the band body, and the front and rear end walls, form a track pad cavity having an enclosed volume capable of being filled with with one of either a gaseous fluid or a liquid fluid.

5. The band track of claim 4 wherein said one of either a gaseous fluid or a liquid fluid filling the enclosed volume of the track pad cavity is pressurized.

6. The band track of claim 1 wherein the track pad further comprises at least one between an interior side of the bearing surface an the rear end wall, and extending between an interior side of the bearing surface and an exterior side of the band body.

7. The band track of claim 1 wherein the bearing surface may be selectively textured to increase fraction of the bearing surface over the prevalent terrain condition.

8. The band track of claim 1 wherein the bearing surface may be selectively studded to increase fraction of the bearing surface over the prevalent terrain condition.

9. In a wheel and band track assembly for a tracked vehicle, comprising a drive wheel, an idler wheel and at least one road wheel around all of which the band track is entrained, such that rotation of the drive wheel drives rotation of the band track around said entrained drive wheel, idler wheel, and road wheels, in turn driving the vehicle, the improvement comprising a track pad disposed on an outer surface of a band body of the band track, the track pad comprising: a plurality of track pad units, each unit having a bearing surface, a front end wall contiguous between the outer surface of the band track and a front edge of the bearing surface, and a rear end wall disposed opposite the front end wall contiguous between the outer surface of the track body and a back edge of the bearing surface, the front and rear end walls being of only such thickness sufficient to support the vehicle as it traverses terrain but sufficiently narrow to collapse under the force of an exiting mine, wherein the front end wall curves in an arc which is convex relative to the forward direction of movement of the track and the rear end wall curves in an arc which is concave relative to the forward direction of movement of the track, the arcs of each end wall configured to matingly nest with each other under the compressive force of said exploding mine.

10. The band track of claim 9 wherein the track pad further comprises sealed side walls which, in combination with a sealed interior face of the bearing surface, and a sealed interior face of the band body, and the front and rear end walls, form a track pad cavity having an enclosed volume capable of being filled with one of either a gaseous fluid or a liquid fluid.

11. The band track of claim 10 wherein said one of either a gaseous fluid or a liquid fluid filling the enclosed volume of the track pad cavity is pressurized.

12. The band track of claim 9 wherein the track pad further comprises at least one interior support wall located between the front end wall and the rear end wall, and extending between an interior side of the bearing surface and an exterior side of the band body.

13. The band track of claim 9 wherein the bearing surface may be selectively textured to increase traction of the bearing surface over prevalent terrain condition.

14. The band track of claim 9 wherein the bearing surface may be selectively studded to increase traction of the bearing surface over prevalent terrain condition.

15. In a band track for a tracked vehicle, the improvement comprising a track pad disposed on an outer surface of a band body of the band track, the track pad comprising: a plurality of track pad units, each unit having a bearing surface, a front end wall contiguous between the outer surface of the band track and a front edge of the bearing surface, and a rear end wall disposed opposite the front end wall contiguous between the outer surface of the track body and a back edge of the bearing surface, the front and rear end walls being of only such width sufficient to support the vehicle as it traverses terrain but sufficiently narrow to collapse under the force of an exploding mine, wherein the front end wall curves in an arc which is convex relative to the forward direction of movement of the track and the rear end wall curves in an arc which is concave relative to the forward direction of movement of the track, the arcs of the front and rear end walls configured to matingly engage each other under the compressive force of the explosion of a mine.

16. The band track of claim 15 wherein the front and rear end walls are of height sufficient to minimize the explosive effect of a mine on the outer surface of the track band.

17. The band track of claim 15 wherein the front and rear end walls are arcuately curved as each extends from the bearing surface to the outer surface of the track band, whereby the shear force of the explosion of a mine is dispersed away from the outer surface.

18. The band track of claim 15 wherein the track pad further comprises sealed side walls which, in combination with a sealed interior face of the bearing surface, and a sealed interior face of the band body, and the front and rear end walls, form a track pad cavity having an enclosed volume capable of being filled with one of either a gaseous fluid or a liquid fluid.

19. The band track of claim 15 wherein the track pad further comprises at least one interior support wall located between the front end wall and the rear end wall, and extending between an interior side of the bearing surface and an exterior side of the band body.

20. The band track of claim 15 wherein the bearing surface may be selectively textured to increase traction of the bearing surface over the prevalent terrain condition.

* * * * *